United States Patent
Shin et al.

(10) Patent No.: US 10,697,538 B2
(45) Date of Patent: Jun. 30, 2020

(54) TORQUE CONVERTER SYSTEM FOR A VEHICLE

(71) Applicants: Hyundai Motor Company, Seoul (KR); Kia Motors Corporation, Seoul (KR)

(72) Inventors: Yong Uk Shin, Suwon-si (KR); Seong Wook Hwang, Gunpo-si (KR); Minho Chae, Incheon (KR); Chon Ok Kim, Yongin-si (KR); Hyun Sik Kwon, Seoul (KR); Sun Sung Kwon, Anyang-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 52 days.

(21) Appl. No.: 16/162,651

(22) Filed: Oct. 17, 2018

(65) Prior Publication Data

US 2020/0063861 A1    Feb. 27, 2020

(30) Foreign Application Priority Data

Aug. 22, 2018  (KR) .......................... 10-2018-0098121

(51) Int. Cl.
| F16H 61/14 | (2006.01) |
| F16H 37/02 | (2006.01) |
| F16H 47/08 | (2006.01) |
| F16H 45/02 | (2006.01) |
| F16H 45/00 | (2006.01) |

(52) U.S. Cl.
CPC ........... *F16H 61/14* (2013.01); *F16H 37/022* (2013.01); *F16H 45/02* (2013.01); *F16H 47/085* (2013.01); *F16H 2045/005* (2013.01); *F16H 2045/0252* (2013.01); *F16H 2045/0268* (2013.01)

(58) Field of Classification Search
CPC ......... F16H 37/022; F16H 61/14; F16H 45/02
See application file for complete search history.

(56) References Cited

U.S. PATENT DOCUMENTS 6,376,927 B1 *  4/2002  Tamai ................... B60K 6/383
                                                           290/31

\* cited by examiner

*Primary Examiner* — Derek D Knight
(74) *Attorney, Agent, or Firm* — Morgan, Lewis & Bockius LLP

(57) ABSTRACT

A torque converter system of a vehicle for delivering an input torque to a transmission may include a front cover of a torque converter receiving the input torque through a torque receiving shaft, an impeller of the torque converter receiving the input torque through the front cover, a turbine of the torque converter disposed opposed to and coaxially with the impeller and rotated by an operation fluid supplied from the impeller thereby driving a transmission input shaft, a reactor of the torque converter disposed between the impeller and the turbine and redirecting the operation fluid from the turbine toward the impeller, and a lock-up clutch disposed inside a transmission to selectively connecting the front cover and the turbine.

12 Claims, 3 Drawing Sheets

TORQUE CONVERTER SYSTEM FOR A VEHICLE

CROSS-REFERENCE TO RELATED APPLICATION

The present application claims priority to Korean Patent Application No. 10-2018-0098121 filed on Aug. 22, 2018, the entire contents of which is incorporated herein for all purposes by this reference.

BACKGROUND OF THE INVENTION

Field of the Invention

The present invention relates to a torque converter system applied to an automatic transmission for a vehicle.

Description of Related Art

A torque converter system of a vehicle is a device configured for transmitting a received engine torque to an automatic transmission by operational fluid.

Such a torque converter typically may include an impeller rotated by a torque of an engine, a turbine rotated by fluid discharged from the impeller, and a reactor, also called a stator, altering fluid flow returning from the turbine to the impeller.

The impeller is fixed to a front cover, i.e., a rotation member disposed at an input side, and discharges the operation fluid toward the turbine by rotating together with the front cover.

A lock-up clutch to selectively interconnect the front cover and the turbine is dispose in a space formed therebetween, and allow direct delivery of the torque of the engine to the turbine.

The lock-up clutch typically may include a clutch plate selectively forming frictional contact with an internal surface of the front cover, and a lock ring attached to an external surface of the turbine and engaged with the clutch plate. A torsional damper is typically disposed between the clutch plate and the lock ring to absorb and attenuating torsional vibration generated by operating the lock-up clutch.

The torsional damper is typically formed as a torsion spring in a form of a compression coil spring.

A typical torque converter is filled with an operation fluid to act as a fluid clutch. Thus, according to a conventional scheme that a lock-up clutch is disposed inside a torque converter, internal flow of the operation fluid becomes complicated, and an operation control of the lock-up clutch is affected. Furthermore, approach to enhance fuel consumption by increasing operation range of the lock-up clutch may be limited.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a torque converter system of a vehicle for delivering an input torque to a transmission having advantages of simplified structure and reduced length.

An exemplary torque converter system of a vehicle for delivering an input torque to a transmission may include a front cover of a torque converter receiving the input torque through a torque receiving shaft, an impeller of the torque converter receiving the input torque through the front cover, a turbine of the torque converter disposed opposed to and coaxially with the impeller and rotated by an operation fluid supplied from the impeller thereby driving a transmission input shaft, a reactor of the torque converter disposed between the impeller and the turbine and redirecting the operation fluid from the turbine toward the impeller, and a lock-up clutch disposed inside a transmission to selectively connecting the front cover and the turbine.

The lock-up clutch may be disposed between a center shaft of the front cover elongated into an internal of the transmission and a torque delivery shaft of the turbine fixedly connected to the transmission input shaft.

The impeller may be formed radially outermost within the front cover. The turbine may be disposed radially internal to the impeller in a direction facing the impeller. The reactor may be disposed between the impeller and the turbine at a transmission side of the converter.

An impact absorbing device may be disposed on the torque delivery shaft of the turbine.

The impact absorbing device may be disposed in an internal space of the turbine.

An impact absorbing device may be disposed on the torque receiving shaft.

A motor/generator may be disposed on the torque receiving shaft at a location between the impact absorbing device and the front cover.

A rotor of the motor/generator may be selectively connectable to the torque receiving shaft via a clutch.

According to a torque converter system according to various exemplary embodiments of the present invention, the lock-up clutch is separated from the torque converter and disposed inside a transmission, and the torque converter may be simplified and shortened.

According to a torque converter system according to various exemplary embodiments of the present invention, fluid flow of the operation fluid may be facilitated, improving fuel economy. Furthermore, the lock-up clutch may be controlled independently from an internal hydraulic pressure of the torque converter, and therefore, operation range of the lock-up clutch may be enlarged.

According to a torque converter system according to various exemplary embodiments of the present invention, an engine vibration may be more effectively absorbed and thereby the vibration of the impeller may be effectively reduced by disposing the impact absorbing device on the engine output shaft, in comparison with the various exemplary embodiments where the impact is absorbed when lock-up clutch is operated.

Furthermore, according to a torque converter system according to various exemplary embodiments of the present invention, the torque converter may have more internal space by removing an impact absorbing device inside the torque converter, and therefore, an overall size of the torque converter may be further reduced, improving installability.

According to a torque converter system according to various exemplary embodiments of the present invention, a motor/generator is disposed on the engine output shaft at a location between the impact absorbing device and the front cover, additionally to a torque converter system according to various exemplary embodiments of the present invention, which shows an applicability of the present invention to a hybrid vehicle.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
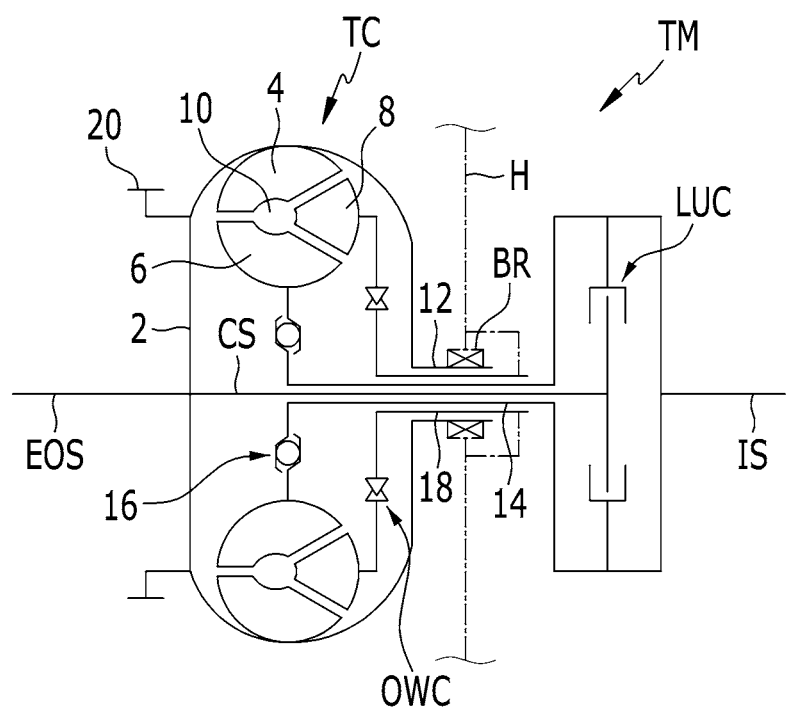
FIG. 1 is a schematic view of a torque converter system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a torque converter system according to various exemplary embodiments of the present invention.

As shown in FIG. 1, a torque converter TC according to various exemplary embodiments of the present invention includes a front cover 2, an impeller 4, a turbine 6, and a reactor 8.

The front cover 2 is formed as a circular member, and receives an engine torque as an input torque by being fixedly connected to an engine output shaft EOS.

The impeller 4 is fixed to the front cover 2, e.g., at an internal side of an external circumference of the front cover 2, for example, by welding. The impeller 4 pumps the operation fluid of a fluid chamber 10 and discharges the fluid toward the turbine 6.

A pump drive hub 12 is coaxially formed with the impeller 4 and protrudes rearward thereof, i.e., toward an opposite side of the engine output shaft EOS, or in the same meaning, toward a transmission TM. The torque converter TC is engaged with a transmission housing H of the transmission through the pump drive hub 12. The pump drive hub 12 may drive a hydraulic pump of the transmission, and may form a hydraulic line for the operation fluid supplied to the fluid chamber 10.

The turbine 6 is disposed opposed to and coaxially with the impeller 4, and is rotated by the operation fluid supplied from the impeller 4, driving an input shaft IS of a transmission TM.

The transmission housing H forms a boundary of the transmission TM in the drawing, and thus, the right side of the transmission housing H in the drawing is regarded as the transmission TM.

The torque of the turbine 6 is delivered to the transmission input shaft IS of the transmission TM by a torque delivery shaft 14, and an impact absorbing device 16 is formed on the torque delivery shaft 14. The impact absorbing device 16 may be formed as a torsional damper in a form of a compression coil spring.

The reactor 8 is coaxially formed with the front cover 2, and disposed between the impeller 4 and the turbine 6 to redirect the operation fluid (e.g., an automatic transmission oil) discharged from the turbine 6 toward the impeller 4.

The reactor 8 is connected to a fixed shaft 18 fixed to the transmission housing H, interposing a one-way clutch OWC, and thus, reacts only in one direction thereof.

The exemplary torque converter system further includes a lock-up clutch LUC. According to an exemplary embodiment of the present invention, the lock-up clutch LUC is disposed inside the transmission TM.

In more detail, the lock-up clutch LUC is disposed between a center shaft CS of the front cover 2 and the torque delivery shaft 14 (or transmission input shaft IS), and when operated, the engine torque may be directly transmitted from the engine output shaft EOS to the transmission input shaft IS.

In the present case, torsional impact and vibration according to an operation of the lock-up clutch LUC is absorbed by the impact absorbing device 16.

Although the drawing illustrates each of the torque delivery shaft 14, the fixed shaft 18, and the center shaft CS is integrally formed across the transmission housing H, the present invention is not limited thereto. Each of the torque delivery shaft 14, the fixed shaft 18, and the center shaft CS may be split into two parts spline-engaged with each other such that the torque converter TC may be detached from the transmission TM.

The lock-up clutch LUC may be formed as a multi-plate hydraulic pressure friction device operated by the hydraulic pressure supplied from a hydraulic pressure control apparatus.

According to a torque converter system according to various exemplary embodiments of the present invention, the impeller 4 is formed radially outermost within the front cover 2, the turbine 6 is disposed radially internal to the impeller 4 in a direction facing the impeller 4, and the reactor 8 is disposed between the impeller 4 and the turbine 6 at a transmission side of the converter TC. Accordingly, sufficient space within the turbine 6 is obtained to dispose the impact absorbing device 16.

According to a torque converter system according to various exemplary embodiments of the present invention, the lock-up clutch LUC is separated from the torque converter TC and disposed inside a transmission, and the torque converter TC may be simplified and shortened.

According to a torque converter system according to various exemplary embodiments of the present invention, fluid flow of the operation fluid may be facilitated, improving fuel economy.

According to a torque converter system according to various exemplary embodiments of the present invention, the lock-up clutch LUC may be controlled independently from an internal hydraulic pressure of the torque converter TC, and therefore, operation range of the lock-up clutch LUC may be enlarged.

An unexplained reference numeral 20 in FIG. 1 indicates a ring gear 20 engaged with a pinion gear of a starting motor or for starting an engine, and the ring gear 20 may be fixed to the front cover 2 by welding. An unexplained reference symbol BR in FIG. 1 indicates a bearing that rotatably supports the pump drive hub 12.

Figure 2:
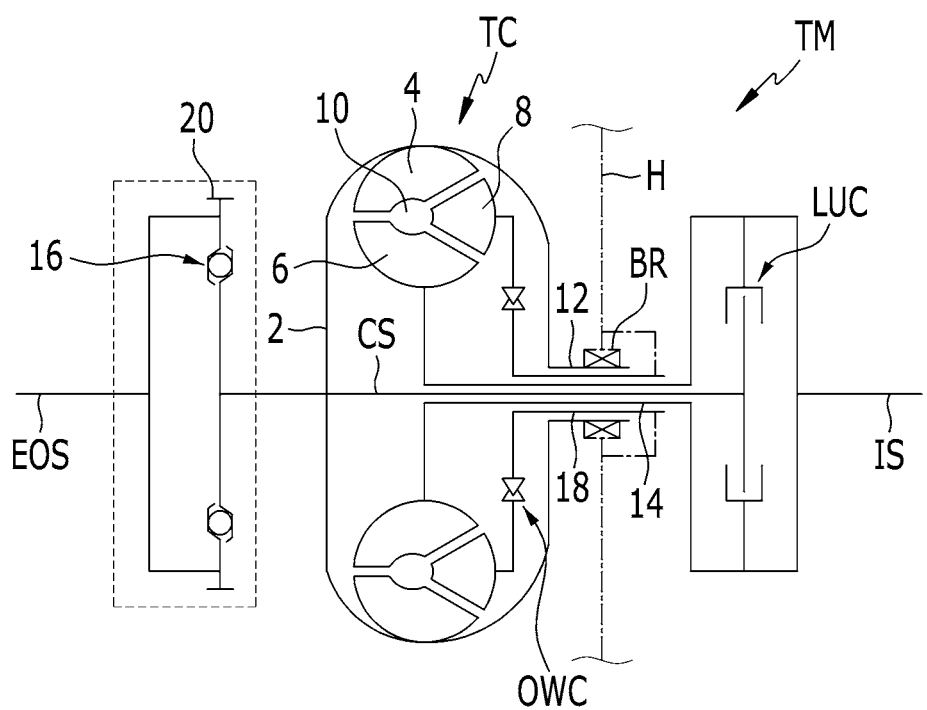
FIG. 2 is a schematic view of a torque converter system according to various exemplary embodiments of the present invention.

FIG. 2 is a schematic view of a torque converter system according to various exemplary embodiments of the present invention.

As shown in FIG. 2, according to a torque converter system according to various exemplary embodiments of the present invention, an impact absorbing device 16 is formed on the engine output shaft EOS, instead of forming an impact absorbing device inside a torque converter as FIG. 1.

The impact absorbing device 16 may be realized as a dual mass flywheel.

Compared with the various exemplary embodiments where the impact is absorbed when lock-up clutch is operated, an engine vibration may be more effectively absorbed and thereby the vibration of the impeller 4 may be effectively reduced by disposing the impact absorbing device 16 on the engine output shaft EOS in the various exemplary embodiments.

Furthermore, according to a torque converter system according to various exemplary embodiments of the present invention, the torque converter TC may have more internal space by removing an impact absorbing device inside the torque converter TC, and therefore, an overall size of the torque converter TC may be further reduced, improving installability.

Figure 3:
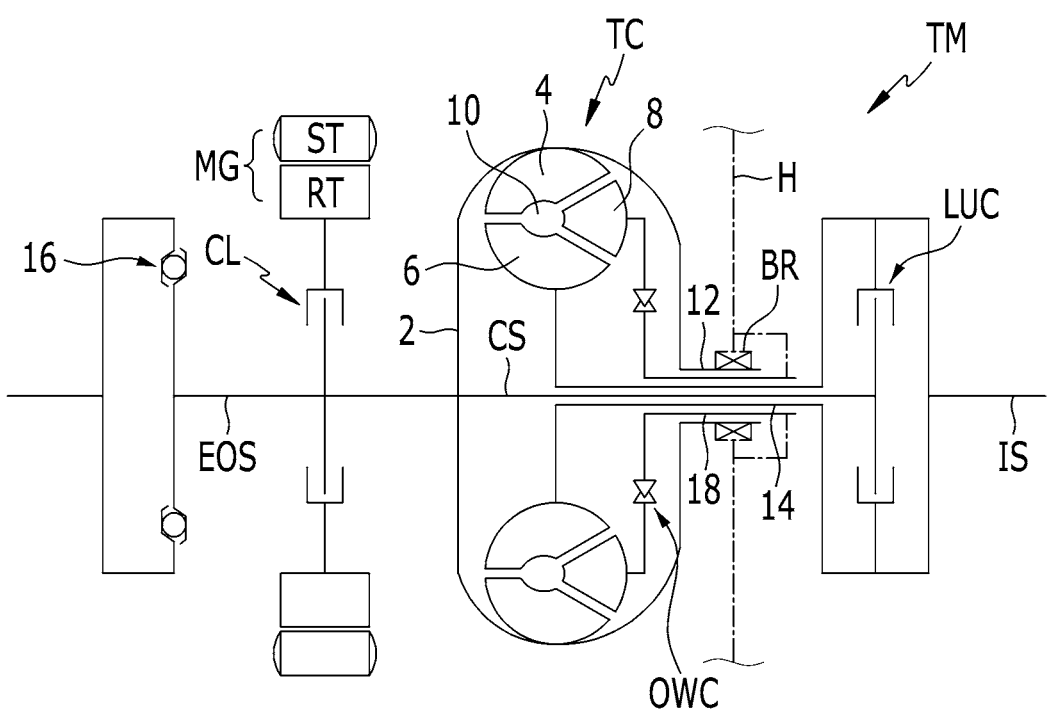
FIG. 3 is a schematic view of a torque converter system according to various exemplary embodiments of the present invention.

FIG. 3 is a schematic view of a torque converter system according to various exemplary embodiments of the present invention.

As shown in FIG. 3, according to a torque converter system according to various exemplary embodiments of the present invention, a motor/generator MG is disposed on the engine output shaft EOS at a location between the impact absorbing device 16 and the front cover 2, additionally to a torque converter system according to various exemplary embodiments of the present invention, which shows an applicability of the present invention to a hybrid vehicle.

The motor/generator MG may be realized as known in the art to function as both a motor and a generator, and includes a stator ST fixedly connected to the transmission housing, a rotor RT rotatable within the stator ST.

The rotor RT of the motor/generator MG is selectively connectable to the engine output shaft EOS via a clutch CL.

Therefore, the motor/generator MG may selectively act as a starting motor, a driving torque source of a vehicle, and a generator.

According to a torque converter system according to various exemplary embodiments of the present invention, the lock-up clutch LUC is separated from the torque converter TC and disposed inside a transmission, and the torque converter TC may be simplified and shortened.

According to a torque converter system according to various exemplary embodiments of the present invention, fluid flow of the operation fluid may be facilitated, improving fuel economy. Furthermore, the lock-up clutch LUC may be controlled independently from an internal hydraulic pressure of the torque converter TC, and therefore, operation range of the lock-up clutch LUC may be enlarged.

According to a torque converter system according to various exemplary embodiments of the present invention, an engine vibration may be more effectively absorbed and thereby the vibration of the impeller may be effectively reduced by disposing the impact absorbing device on the engine output shaft, in comparison with the various exemplary embodiments where the impact is absorbed when lock-up clutch is operated.

Furthermore, according to a torque converter system according to various exemplary embodiments of the present invention, the torque converter TC may have more internal space by removing an impact absorbing device inside the torque converter TC, and therefore, an overall size of the torque converter TC may be further reduced, improving installability.

According to a torque converter system according to various exemplary embodiments of the present invention, a motor/generator MG is disposed on the engine output shaft EOS at a location between the impact absorbing device 16 and the front cover 2, additionally to a torque converter system according to various exemplary embodiments of the present invention, which shows an applicability of the present invention to a hybrid vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque converter system of a vehicle for delivering an input torque to a transmission, the torque converter system comprising:
   a front cover of a torque converter receiving the input torque through a torque receiving shaft connected to the front cover;
   an impeller of the torque converter receiving the input torque through the front cover;
   a turbine of the torque converter disposed opposite to and coaxially with the impeller and rotated by an operation fluid supplied from the impeller for driving a transmission input shaft;
   a reactor of the torque converter disposed between the impeller and the turbine and redirecting the operation fluid from the turbine toward the impeller; and
   a lock-up clutch disposed inside the transmission to selectively connecting the front cover and the turbine,
   wherein the lock-up clutch is disposed at an axially opposite side of a transmission housing with respect to the front cover, the impeller, and the turbine.

2. The torque converter system of claim 1,
   wherein the lock-up clutch is disposed between a center shaft of the front cover and a torque delivery shaft coupled to the turbine and fixedly connected to the transmission input shaft, and
   wherein the center shaft is connected to the torque receiving shaft, elongates into an internal of the transmission, and is connected to the lock-up clutch.

3. The torque converter system of claim 2, wherein an impact absorbing device is disposed on the torque delivery shaft of the turbine.

4. The torque converter system of claim 3, wherein the impact absorbing device is disposed in an internal space of the turbine.

5. The torque converter system of claim 2, wherein an impact absorbing device is disposed on the torque receiving shaft.

6. The torque converter system of claim 5, wherein a motor/generator is disposed on the torque receiving shaft at a location between the impact absorbing device and the front cover.

7. The torque converter system of claim 6, wherein a rotor of the motor/generator is selectively connectable to the torque receiving shaft via a clutch mounted on the torque receiving shaft.

8. The torque converter system of claim 1,
   wherein the center shaft is coaxially disposed inside the torque delivery shaft,
   wherein the torque delivery shaft is coaxially disposed inside a fixed shaft connecting the reactor and the transmission housing, and
   wherein the fixed shaft is coaxially disposed inside a pump drive hub formed with the impeller.

9. The torque converter system of claim 1,
   wherein the impeller is formed radially outermost within the front cover;
   wherein the turbine is disposed radially internal to the impeller in a direction facing the impeller; and
   wherein the reactor is disposed between the impeller and the turbine at a transmission side of the torque converter.

10. The torque converter system of claim 1, wherein the reactor is connected to a fixed shaft fixed to the transmission housing.

11. The torque converter system of claim 10, wherein a one-way clutch is disposed on the fixed shaft.

12. The torque converter system of claim 1, wherein the front cover is connected to a ring gear.

* * * * *